E. J. LEWIS.
FRUIT CORING MACHINE.
APPLICATION FILED SEPT. 14, 1920.
1,362,807.
Patented Dec. 21, 1920.
2 SHEETS—SHEET 1.
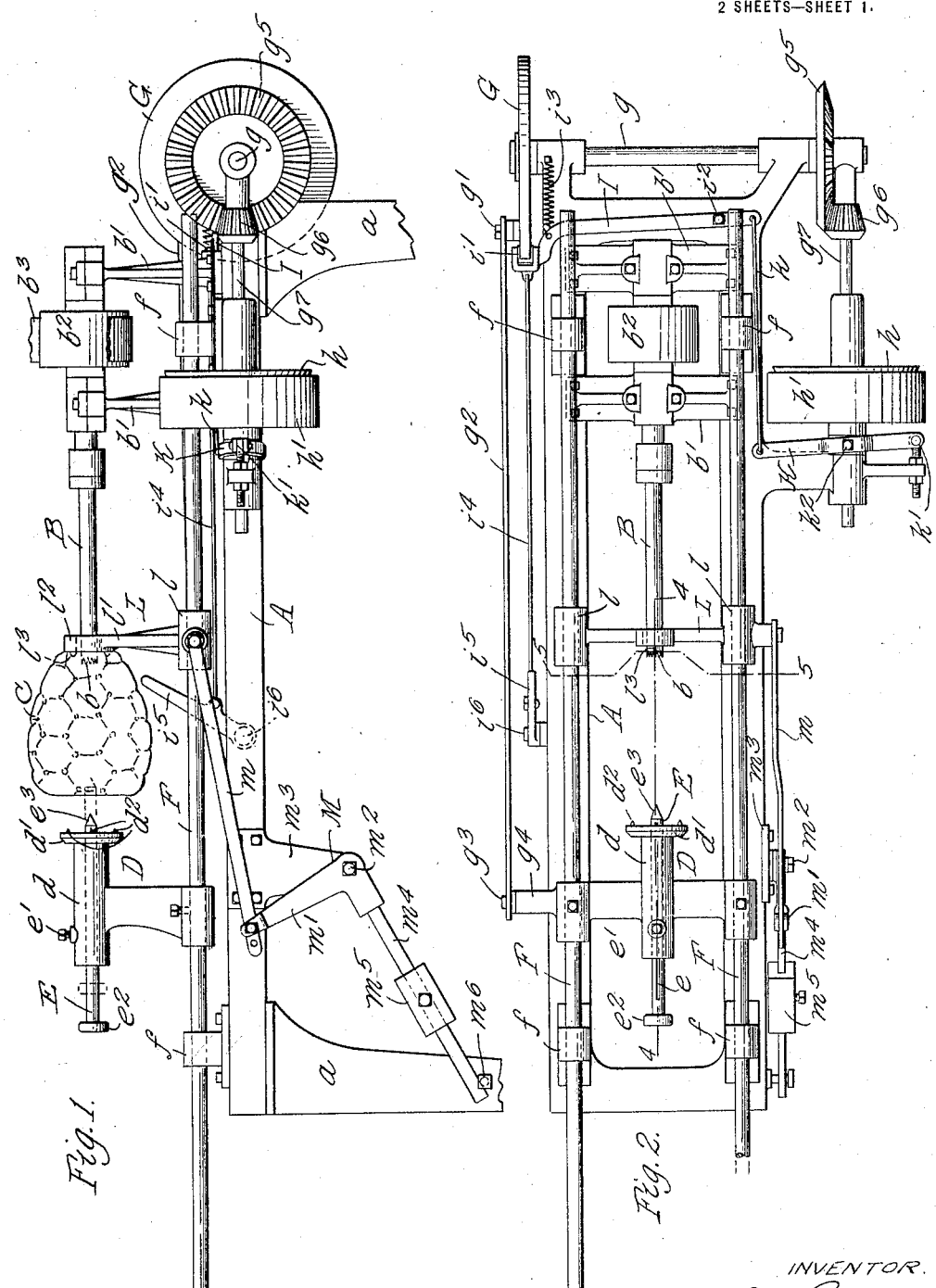
INVENTOR.
Elgie J. Lewis.
By Parker & Brockwow.
ATTORNEYS.

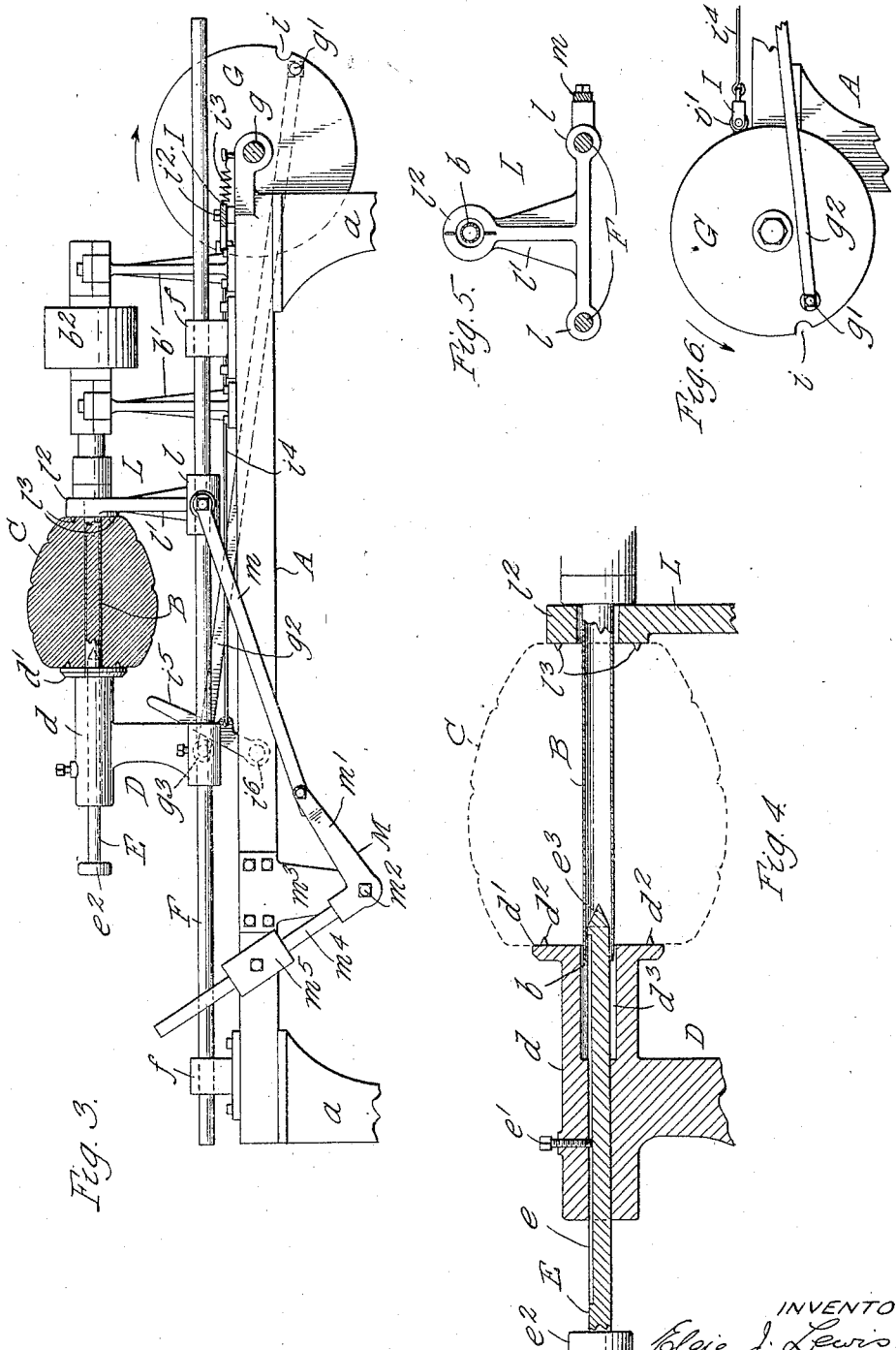

UNITED STATES PATENT OFFICE.

ELGIE J. LEWIS, OF MIDDLEPORT, NEW YORK.

FRUIT-CORING MACHINE.

1,362,807.   Specification of Letters Patent.   Patented Dec. 21, 1920.

Application filed September 14, 1920. Serial No. 410,256.

*To all whom it may concern:*

Be it known that I, ELGIE J. LEWIS, citizen of the United States, residing at Middleport, in the county of Niagara and State of New York, have invented a new and useful Improvement in Fruit-Coring Machines, of which the following is a specification.

This invention relates to improvements in machines for coring or removing the central portions of pineapples or other fruits.

The objects of this invention are to provide a coring machine which is so constructed and organized as to facilitate and expedite the operation of coring fruit; also to provide a machine of this kind on which the fruit can be more easily and accurately placed in position for coring; also to provide means which operate automatically to strip the fruit from the coring tube; also to provide mechanism of improved construction for starting and stopping the machine; and also to improve the construction of machines of this kind in other respects herein-after specified.

In the accompanying drawings:—

Figure 1 is a rear elevation of a fruit coring machine embodying the invention.

Fig. 2 is a top plan view thereof.

Fig. 3 is a rear elevation partly in section showing the parts of the machine in different positions.

Fig. 4 is a central sectional elevation thereof on an enlarged scale, on line 4—4 Fig. 2.

Fig. 5 is a fragmentary transverse sectional elevation thereof on line 5—5, Fig. 2.

Fig. 6 is a fragmentary front elevation thereof showing a part of the cross head reciprocating mechanism.

The machine will be hereinafter described as employed for coring pineapples, but it is not intended thereby to limit this invention to such use, since it will be evident that the machine can be used for coring other fruit.

In the embodiment of the invention illustrated in the accompanying drawings, A represents a base or frame on which the parts of the machine are mounted and which is preferably supported by legs $a$ which are partly shown in Figs. 1 and 3. The frame of the machine may be of any other suitable construction.

The core is cut out of a pineapple by means of a hollow cutting member or tube which is forced through the center of the pineapple, severing the core from the pineapple and forcing the core into the interior of the hollow cutting member, the cutting member in the construction shown being rotatable but not being movable endwise. B represents the hollow rotary cutting member having a front cutting portion $b$. This cutting member is rotatably mounted in bearings or standards $b'$ suitably secured on the base or frame A of the machine, and driving means are secured to the hollow cutting member, preferably between the bearing standards $b'$. In the construction shown, a pulley $b^2$ adapted to be driven by means of a belt $b^3$ is provided.

The pineapples to be cored, represented by C, are pressed toward the coring tube B by means of a reciprocatory slide or tail stock D which is adapted to engage an end of the pineapple and push the same on the coring tube B as shown in Figs. 3 and 4, thus causing the coring tube to cut the core from the pineapple. The reciprocatory slide is preferably provided with a centering spindle E which is adapted to move endwise in the head $d$ of the slide D. In the construction shown, the centering spindle is provided with a keyway or longitudinal slot $e$ into which the end of a screw $e'$ enters to hold the spindle against turning. The outer end of the centering spindle is preferably provided with a knob or handle portion $e^2$ by means of which the spindle may be moved relatively to the head. The spindle is provided at its inner end with a point $e^3$ which may be inserted into the center of the pineapple core.

The head $d$ of the slide D is provided with an enlarged or flanged portion $d'$ having prongs or projections $d^2$ adapted to engage the pineapple and hold the same against turning when the enlarged or flanged portion $d'$ engages the cut end of the pineapple. The longitudinal hole in the slide through which the centering spindle extends is preferably enlarged at the inner portion of the slide as shown at $d^3$ to enable the rotary cutting tube to enter into the head of the slide D and thus insure the complete cutting of the core from the pineapple and prevent the dulling of the cutting edge of the member B. When the rotary coring member is in this position, the spindle extends into the coring member.

The slide D may be guided in its movement lengthwise of the frame of the machine by any desired means. In the construction shown the slide is rigidly secured to a pair of sliding members or rods F which are mounted in bearings $f$ secured to the base A of the machine. Any other means for permitting the slide D to move lengthwise of the frame may be employed.

The mechanism shown in the drawings for moving the slide lengthwise of the machine includes a transverse rotary shaft $g$ journaled at one end of the machine and having a crank disk G rigidly secured thereon. This disk has a crank pin $g'$ to which one end of a connecting rod $g^2$ is secured. The other end of this connecting rod is pivoted at $g^3$ to an arm or extension $g^4$ of the slide D. The shaft $g$ may be rotated in any desired manner, for example, by means of bevel gears $g^5$ and $g^6$ connecting the shaft $g$ with a shaft $g^7$ extending lengthwise of the machine at the rear portion thereof. The shaft $g^7$ is driven by means of a clutch including a clutch member $h$ secured on the shaft $g^7$ and a driving member $h'$ which may be moved into or out of engagement with the clutch member $h$.

In order to stop the slide D in a position in which the machine is adapted to receive a pineapple, means are provided for stopping the rotation of the crank disk after it has turned through a revolution. For this purpose a clutch actuating mechanism is provided which is preferably constructed as follows:—

The crank disk G is provided on its periphery with a recessed portion $i$ into which a roller $i'$ pivoted on a lever I is adapted to enter. This lever is pivoted at $i^2$ and a spring $i^3$ normally pulls the roller $i'$ into the recess $i$. A link $i^4$ connects the lever I with an operating handle $i^5$ so that when the operating handle is turned on its pivot $i^6$ the lever I is swung about its pivot against the spring $i^3$, withdrawing the roller $i'$ out of the recess $i$ and permitting the crank disk G to rotate. At the same time the swinging of the lever I causes the clutch member $h'$ to be moved into engagement with the member $h$, this being accomplished by means of a link $k$ connecting a lever K pivoted at $k'$ on the frame of the machine and having a pivotal connection $k^2$ with the clutch member $h'$. Consequently, when the operating handle $i^5$ is turned about its pivot to withdraw the roller $i'$ from the recess $i$ the clutch members are placed into engagement and the crank disk G is rotated. This disk moves the slide D from the position shown in Figs. 1 and 2 to the position shown in Fig. 3 and back again to its starting position. During the rotation of the disk G the roller $i'$ engages with the periphery of the disk G and thus holds the clutch in engagement until the roller again drops into the recess $i$, thus disengaging the clutch members.

Means are provided for stripping or removing the pineapple from the coring tube B after the coring operation has been completed. For this purpose a stripping member L is provided which has one or more cylindrical bearing portions $l$ preferably slidably arranged on the reciprocatory rods F and an upwardly projecting portion $l'$ having a head $l^2$ provided with a hole through which the coring tube B extends. This head is provided with prongs or projecting portions $l^3$ adapted to enter into the pineapple to hold the same against rotation. When the machine is in a position to receive a pineapple, an end of the pineapple is placed by an operator on the end of the rotary cutting tube B and is moved into engagement with the prongs $l^3$ to hold the pineapple against rotation. When the machine is placed into operation the slide D pushes the pineapple onto the rotary cutting tube and against the stripping member, moving the stripping member from the position shown in Figs. 1 and 2 to the position shown in Fig. 3. The stripping member may be moved in the reverse direction for removing the pineapple from the coring tube by any suitable means. If desired, the tendency of the bearings $l$ to bind on the rods F may be depended upon to move the stripping member in a direction to remove the pineapple from the coring tube. In the accompanying drawings additional means are provided for insuring the operation of the stripping member, which are constructed as follows:—

The stripping member is connected by means of a link $m$ to an arm $m'$ of a bell crank lever M pivoted at $m^2$ on a downwardly extending bracket $m^3$ secured to the frame. This bell crank lever has an arm $m^4$ having a weight $m^5$ adjustably secured thereon, which swings the bell crank lever about its pivot, thus pulling the link $m$ in a direction to move the stripping member L from the position shown in Fig. 3 to the position shown in Figs. 1 and 2, thus causing the stripping member to remove the pineapple from the coring tube. When the stripping member has reached the position shown in Figs. 1 and 2, the arm $m^4$ of the bell crank lever engages a stop $m^6$ which limits the movement of the stripping member.

In the operation of the machine a pineapple is placed so that the cutting tube B is substantially central with reference to one end thereof, this being easily accomplished by wringing off the top of the pineapple, leaving a central cavity therein into which the end of the coring tube may enter. The pineapple is then moved into engagement with the projecting prongs $l^3$ on the stripping member L to prevent the pineapple from being rotated by the coring tube. The other end of the pineapple is centered by means of the centering spindle E which may be moved independently of the head of the slide. The operator then actuates the handle $i^5$, thus setting the machine into operation. This starts rotation of the crank disk G and causes the slide D to be advanced toward the pineapple, the centering spindle assuming its original position relatively to the slide as the slide advances. The part $d'$ of the slide then engages the pineapple and pushes the same onto the coring tube B, the pineapple being pushed beyond the cutting end of the coring tube so that the core is completely cut from the pineapple and is pushed into the coring tube by the spindle. The cores as usual are discharged from the other end of the coring tube. When the slide D has reached the limit of its forward movement, it is returned and the movement of the sliding members F, together with the weight $m^5$, causes the stripping member L to move back toward its initial position and to remove the pineapple from the coring tube. The pineapple then drops downwardly through the base A of the machine from where it is conveyed by any suitable means. The parts of the machine are then in position to receive another pineapple.

I claim as my invention:—

1. In a fruit coring machine, the combination of a rotary tubular coring member, a centering device which first engages the fruit for positioning said fruit relatively to said coring member, and a slide movably mounted on said machine and which is adapted to engage the fruit held by said centering device and to push the fruit onto said coring member, whereby the core is cut from said fruit.

2. In a fruit coring machine, the combination of a rotary tubular coring member, a slide movably mounted on said machine and having a part adapted to engage the fruit and push the same onto said coring member, and a centering device movable relatively to said slide in the direction of movement of said slide and adapted to engage the fruit to center the same relatively to said coring member.

3. In a fruit coring machine, the combination of a rotary tubular coring member, a slide movably mounted on said machine and having a part adapted to engage the fruit and push the same onto said coring member, and a centering spindle slidably mounted on said slide and having a part adapted to engage the fruit and hold the same in position to be engaged by said slide.

4. In a fruit coring machine, the combination of a rotary tubular coring member, and a slide movable toward said coring tube and having a face adapted to engage the fruit and push the same onto said coring member, said face having a depressed portion into which the coring member is adapted to enter.

5. In a fruit coring machine, the combination of a rotary tubular coring member, a slide movable toward said coring tube and having a face adapted to engage the fruit and push the same onto said coring member, said face having a depressed portion into which the coring member is adapted to enter, and a centering spindle movable relatively to said slide and extending out of said depressed portion and adapted to enter into said coring member when the same is in said depressed portion.

6. In a fruit coring machine, the combination of a rotary tubular coring member, a centering device for positioning said fruit relatively to said coring member, a slide movably mounted on said machine and adapted to engage the fruit and push the same onto said coring member, whereby the core is cut from said fruit, and power operated mechanism controlled by an operator for causing said slide to complete its path of movement and to stop in its starting position.

7. In a fruit coring machine, the combination of a rotary tubular coring member, a slide movably mounted on said machine and adapted to engage the fruit and push the same onto said coring member to cut the core from said fruit, a crank for actuating said slide, and a clutch which is adapted to stop the rotation of said crank after a revolution thereof.

8. In a fruit coring machine, the combination of a rotary tubular coring member, a slide movably mounted on said machine and adapted to engage the fruit and push the same onto said coring member to cut the core from said fruit, a crank disk for actuating said slide, a clutch adapted to rotate said disk, and a clutch actuating lever having a part engaging said disk and held by said disk in a position to hold the clutch members in engagement, said disk having a depressed portion in its periphery into which said lever is adapted to enter, causing the clutch to stop the operation of the machine.

9. In a fruit coring machine, the combination of a rotary tubular coring member, a slide movably mounted on said machine and adapted to engage the fruit and push the same onto said coring member to cut the core from said fruit, a crank for actuating said slide and including a disk having a recess in its periphery, a clutch for starting and stopping said machine, a lever for operating said clutch and engaging said disk, said lever being held in a position by said disk to cause the clutch to drive the machine and causing the machine to stop when said lever enters said recess, and an operating handle for moving said lever out of said recess.

10. In a fruit coring machine, the combination of a rotary tubular coring member, a slide movably mounted on said machine and adapted to engage the fruit and push the same onto said coring member to cut the core from said fruit, and a stripping member adapted to engage the fruit and remove the same from said coring member.

11. In a fruit coring machine, the combination of a rotary tubular coring member, a slide movably mounted on said machine and adapted to engage the fruit and push the same onto said coring member to cut the core from said fruit, a stripping member adapted to engage the fruit and remove the same from said coring member, and means for yieldingly pressing said stripping member against the fruit.

12. In a fruit coring machine, the combination of a rotary tubular coring member, a slide movably mounted on said machine and adapted to engage the fruit and push the same onto said coring member to cut the core from said fruit, a stripping member slidably arranged on said machine and adapted to engage the fruit for removing the same from the coring member, and a weight for yieldingly pressing said stripping member against the fruit.

13. In a fruit coring machine, the combination of a rotary tubular coring member, a slide movably mounted on said machine and adapted to engage the fruit and push the same onto said coring member to cut the core from said fruit, a slide rod on which said slide is secured and which is adapted to move lengthwise of the machine, and a stripping member mounted on said slide rod and adapted to engage the fruit to remove the same from said coring tube.

14. In a fruit coring machine, the combination of a rotary tubular coring member, a slide movably mounted on said machine and adapted to engage the fruit and push the same onto said coring member to cut the core from said fruit, a slide rod on which said slide is secured and which is adapted to move lengthwise of the machine, and a stripping member having a sliding connection with said slide rod and having a part spaced at a distance from said connection and adapted to engage the fruit to remove the same from the coring tube.

15. In a fruit coring machine, the combination of a rotary tubular coring member, a slide movably mounted on said machine and adapted to engage the fruit and push the same onto said coring member to cut the core from said fruit, a slide rod on which said slide is secured and which is adapted to move lengthwise of the machine, a stripping member slidably mounted on said slide rod and adapted to engage the fruit to remove the same from the coring tube, and means connected with said stripping member for yieldingly pressing said stripping member against said fruit.

Witness my hand this 11th day of September, 1920.

ELGIE J. LEWIS.

Witnesses:
F. E. SNELL,
AMANDUS WITTMAN.